United States Patent
Hood et al.

(10) Patent No.: US 8,855,492 B2
(45) Date of Patent: Oct. 7, 2014

(54) SELECTABLE MULTIPLE-WAVELENGTH ACCESS FOR OPTICAL NETWORK UNITS IN ARRAYED WAVEGUIDE BASED WAVELENGTH DIVISION MULTIPLEXING PASSIVE OPTICAL NETWORK

(75) Inventors: David Hood, Palo Alto, CA (US); Stefan Dahlfort, Santa Clara, CA (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 151 days.

(21) Appl. No.: 13/352,956

(22) Filed: Jan. 18, 2012

(65) Prior Publication Data
US 2013/0183039 A1    Jul. 18, 2013

(51) Int. Cl.
  *H04J 14/00*   (2006.01)

(52) U.S. Cl.
  USPC ................................. 398/72; 398/66; 398/68

(58) Field of Classification Search
  None
  See application file for complete search history.

(56) References Cited

U.S. PATENT DOCUMENTS

| | | | |
|---|---|---|---|
| 7,002,697 B2* | 2/2006 | Domash et al. | 356/519 |
| 7,706,643 B1* | 4/2010 | Meli et al. | 385/24 |
| 8,369,706 B2* | 2/2013 | Sorin | 398/72 |
| 8,457,165 B2* | 6/2013 | Liu et al. | 372/20 |
| 2002/0021471 A1 | 2/2002 | Tsuruta | |
| 2006/0115271 A1* | 6/2006 | Hwang et al. | 398/72 |
| 2008/0013950 A1* | 1/2008 | Boudreault et al. | 398/59 |
| 2009/0162065 A1 | 6/2009 | Mizutani et al. | |
| 2009/0185807 A1 | 7/2009 | Lee et al. | |
| 2011/0085795 A1 | 4/2011 | Ozaki | |
| 2011/0142444 A1 | 6/2011 | Borges et al. | |
| 2012/0128360 A1* | 5/2012 | Lee et al. | 398/72 |
| 2012/0315040 A1 | 12/2012 | Dahlfort et al. | |
| 2013/0136447 A1* | 5/2013 | Cavaliere et al. | 398/49 |

OTHER PUBLICATIONS

"Common Public Radio Interface (CPRI); Interface Specification", http://www.cpri.info/downloads/CPRI, CPRI Specification V4.2, (Sep. 29, 2010),113 pgs.
ITU-T; G.987.3; *10-Gigabit-capable passive optical networks (XG-PON):Transmission convergence (TC) specifications*; Oct. 2010; 10 pp. 11/.
ITU-T; G.984.3; *Gigabit-capable Passive Optical Networks (G-PON): Transmission convergence layer specification*.
U.S. Appl. No. 13/236,360, filed Sep. 19 2011.
Non-Final Office Action, U.S. Appl. No. 13/157,017, dated Apr. 16, 2014; 13 pages.

* cited by examiner

*Primary Examiner* — Ken Vanderpuye
*Assistant Examiner* — Jai Lee
(74) *Attorney, Agent, or Firm* — Blakely, Sokoloff, Taylor & Zafman LLP (57) ABSTRACT

An optical network unit (ONU) accesses services provided by multiple optical line terminals (OLTs) in a wavelength division multiplexing (WDM) passive optical network (PON). The ONU receives downstream signals from a first plurality of OLTs through a designated port of an arrayed waveguide (AWG). At any given time, the bandpass filter module can select any one of a first plurality of AWG cycles allocated to the first plurality of OLTs. Based on received downstream signals, the ONU transmits upstream signals to a second plurality of OLTs through the designated port of the AWG. At any given time, the bandpass filter module and a transmitter of the ONU can select any one of a second plurality of AWG cycles allocated to the second plurality of OLTs. The ONU may be configured with a plurality of receivers and transmitters, whereby it is enabled to simultaneously subscribe to a plurality of AWG cycles.

22 Claims, 9 Drawing Sheets

SELECTABLE MULTIPLE-WAVELENGTH ACCESS FOR OPTICAL NETWORK UNITS IN ARRAYED WAVEGUIDE BASED WAVELENGTH DIVISION MULTIPLEXING PASSIVE OPTICAL NETWORK

FIELD OF THE INVENTION

Embodiments of the invention relate to a passive optical network (PON). More specifically, embodiments of the invention relate to a wavelength division multiplexing (WDM) PON based on arrayed waveguides (AWGs).

BACKGROUND

A passive optical network (PON) consists of one or more optical line terminations (OLTs) (each of which is a service provider node), a number of optical network units (ONUs) (each of which is a subscriber node), and the fibers and splitters between them (called an optical distribution network (ODN)). One type of PON is a wavelength division multiplexing (WDM) PON, which multiplexes a number of optical carrier signals onto a single optical fiber by using different wavelengths (colors) of laser light.

A WDM PON can incorporate an arrayed waveguide (AWG) within its ODN. When laser light enters an AWG from a single fiber, the laser light is de-multiplexed into multiple separate wavelengths with each wavelength exiting a port of the AWG. The signals carried by the laser light may be provided by an OLT. Thus, multiple subscribers that are in the same geographical proximity can access the services of a service provider by each connecting to a different port of the AWG.

By the principle of reciprocity that applies to non-magnetic passive optical devices (e.g., the AWG), a signal of the proper wavelength may be injected to the given port of the AWG, whereupon it is multiplexed onto the single fiber. This provides an upstream path from the ONU to the OLT.

Conventional AWG-based WDM PON access networks have several inherent constraints that limit their ability to provide open access. Open access refers to the sharing of access network infrastructure among multiple service providers and/or multiple services offered by the same business entity. Each of the providers/services may offer a different format, speed, pricing, quality of experience, or other differentiating features. For business or technical reasons, it may not be feasible to provide all of these options from a single OLT. However, cost constraints at the OLT strongly motivate optical design in arrayed devices, wherein each transmitter (receiver) operates at a wavelength adjacent to that of its neighbor. The arrayed device thus produces a spectrum of transmit (receive) wavelengths. In a conventional network with an AWG in the field, a given transmitter (receiver) is mapped to a given ONU in a fixed relationship, as determined by the ONU's connectivity to an AWG port. As such, there is no flexibility point to assign OLT transmitters (receivers) to randomly-located ONUs.

An existing alternative solution proposes to separate each wavelength in the central office, and patch the proper wavelength to the proper OLT port either manually or through a reconfigurable optical add-drop multiplex (ROADM). This solution implies additional cost and complexity in the central office. Another possible solution could involve fully tunable OLT transmitters (receivers), but these may not be technically or economically feasible.

SUMMARY

An optical network unit (ONU) accesses services provided by a plurality of optical line terminals (OLTs) in a wavelength division multiplexing (WDM) passive optical network (PON). The OLTs are coupled to the ONU through an optical distribution network that includes an arrayed waveguide (AWG) having multiple ports that transmit multiple AWG cycles in both upstream and downstream directions. Each of the AWG cycles has a cyclically recurring wavelength pattern with an i-th wavelength in each of the AWG cycles being available at an i-th port of the AWG. The ONU receives downstream signals from a first plurality of OLTs through a designated port of the AWG and a bandpass filter module coupled to the designated port. The first plurality of OLTs are allocated with a first plurality of AWG cycles for downstream transmission. The bandpass filter module is adapted to select any one of the first plurality of AWG cycles at a given time. Based on received downstream signals, the ONU transmits upstream signals to a second plurality of OLTs through the designated port of the AWG and the bandpass filter module. The second plurality of OLTs are allocated with a second plurality of AWG cycles for upstream reception. The bandpass filter module is adapted to select any one of the second plurality of AWG cycles at a given time. The ONU transmitter is likewise adapted to transmit on the correct cycle as well as the correct member wavelength i.

A network element functioning as an ONU accesses services provided by a plurality of OLTs in a WDM PON. The OLTs are coupled to the ONU through an optical distribution network that includes an AWG having multiple ports that transmit multiple AWG cycles in both upstream and downstream directions. Each of the AWG cycles has a cyclically recurring wavelength pattern with an i-th wavelength in each of the AWG cycles being available at an i-th port of the AWG. The network element includes a bandpass filter module coupled to a designated one of the ports of the AWG. The bandpass filter module is adapted to select, at a given time, any one of a first plurality of AWG cycles allocated to a first plurality of OLTs for downstream reception by the ONU, and the bandpass filter module is further adapted to select, at a given time, any one of a second plurality of AWG cycles allocated to a second plurality of OLTs for upstream reception by the OLTs. The network element also includes one or more receivers coupled to the bandpass filter module. The one or more receivers are adapted to receive the downstream signals from the first plurality of OLTs through the designated port of the AWG and the bandpass filter module. The network element also includes one or more transmitters coupled to the bandpass filter module. The one or more transmitters are adapted to transmit the upstream signals to the second plurality of OLTs through the designated port of the AWG and the bandpass filter module. Based on received downstream signals, the ONU transmitters are adapted to transmit on the correct cycle as well as the correct member wavelength.

BRIEF DESCRIPTION OF THE DRAWINGS

The present invention is illustrated by way of example, and not by way of limitation, in the figures of the accompanying drawings in which like references indicate similar elements. It should be noted that different references to "an" or "one" embodiment in this disclosure are not necessarily to the same embodiment, and such references mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

DETAILED DESCRIPTION

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art, that the invention may be practiced without such specific details. Those of ordinary skill in the art, with the included descriptions, will be able to implement appropriate functionality without undue experimentation.

Figure 1:
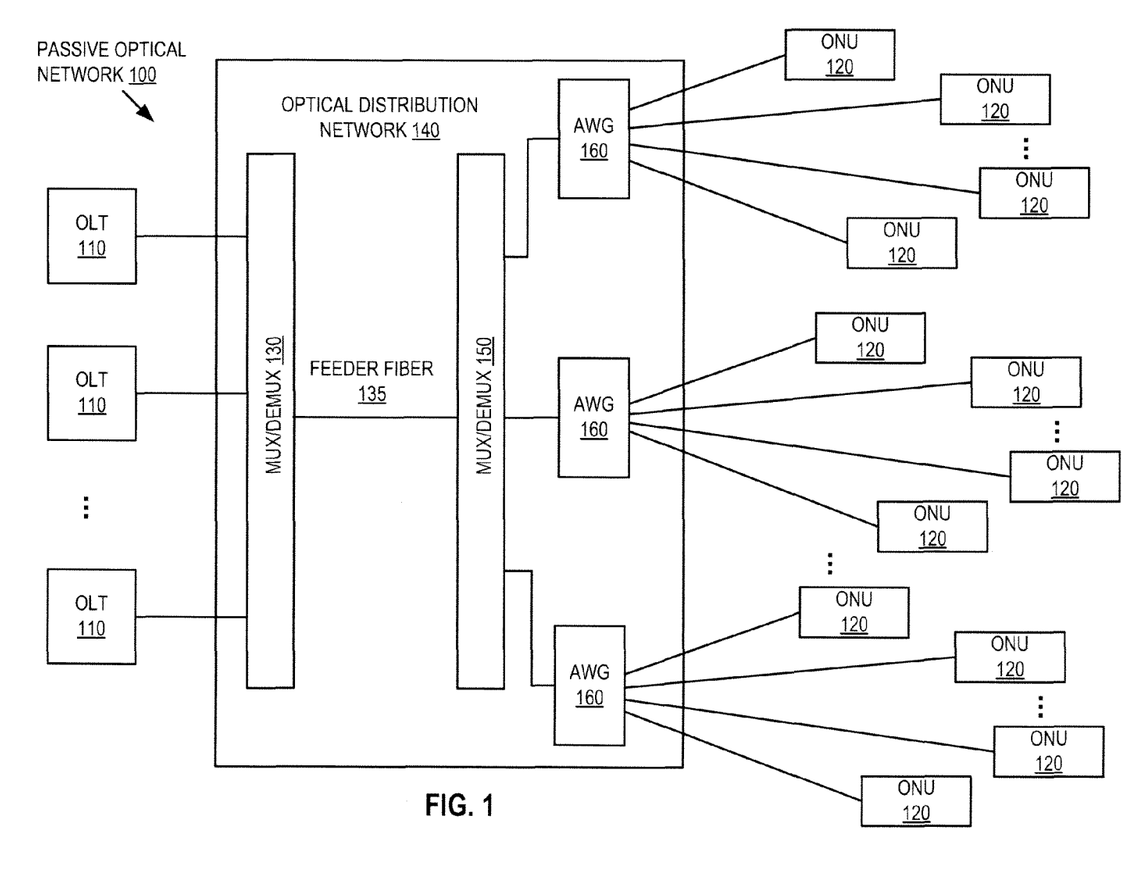
FIG. 1 is a diagram of one embodiment of an AWG-based WDM PON.

FIG. 1 is a diagram of one embodiment of an AWG-based WDM PON 100. The PON 100 provides connectivity from a set of service providers (SPs) and/or services to multiple subscribers, and allows each subscriber to selectively access a subset of the SPs and/or services. The PON 100 includes a set of optical line terminals (OLTs) 110 and a set of optical network units (ONUs) 120. The OLTs 110 and the ONUs 120 are connected via an optical distribution network (ODN) 140 having a many-to-many topology. The OLTs 110 can be operated by or belong to one or more network service providers. The ONUs 120 are devices that terminate the PON 100 and present telecommunications service interfaces to the subscribers. As well as different SPs, any given ONU 120 may be adapted, either in its hardware capabilities or its software configuration or both, to receive and transmit one or more services characterized by unique rates, speeds, modulation formats or other attributes. It is thus understood that not all ONUs 120 are necessarily mutually identical.

In the following descriptions, the term "downstream" refers to the direction of transmission from the OLTs 110 to the ONUs 120, and the term "upstream" refers to transmission from the ONUs 120 to the OLTs 110.

In one embodiment, the ODN 140 includes a feeder fiber 135 coupled between two sets of multiplexers/de-multiplexers (mux/demux) 130 and 150. The mux/demux 130 can be a power splitter, a wavelength splitter, or a combination of both. The mux/demux 150 is coupled to one or more AWGs 160, and can have a multi-branch optical tree configuration. The mux/demux 150 can be optional in the case that only a single AWG 160 is present. Each AWG 160 is connected to a set of ONUs 120; e.g., the ONUs located in geographical proximity. Each AWG 160 has a common port at the distal side to the ONUs 120, and multiple individual ports at the proximal side to the ONUs 120. Between the common port and the individual ports, the AWG 160 multiplexes channels of several wavelengths onto a single optical fiber (upstream) and de-multiplexes signals on the single optical fiber into individual channels of different wavelengths (downstream). Spectral properties of the AWG 160 are described in detail below with reference to FIG. 2.

The AWG 160 referred to herein is a cyclic AWG. According to an embodiment of the invention, different SPs and services can be allocated to separate AWG cycles (also referred to as "cycles" or "spectral cycles") within the same overall band plan. Each of the AWG cycles has a cyclically recurring wavelength pattern, with an i-th wavelength in each of the AWG cycles being available at an i-th port of the AWG. The use of the AWG 160 can increase network capacity, as the AWG 160 can de-multiplex a spectral range into multiple cycles and multiplex the cycles into the spectral range. In aspects of the present invention that are clarified in the subsequent figures, fixed/pluggable bandpass filter (BPF) hardware or a tunable BPF module can be used to select the proper cycle to thereby enable or limit the connectivity of an AWG-connected ONU 120 to appropriate service providers or services. Particularly if it is fixed or pluggable, the BPF module may be integral to the ONU or separate from the ONU.

Figure 2:
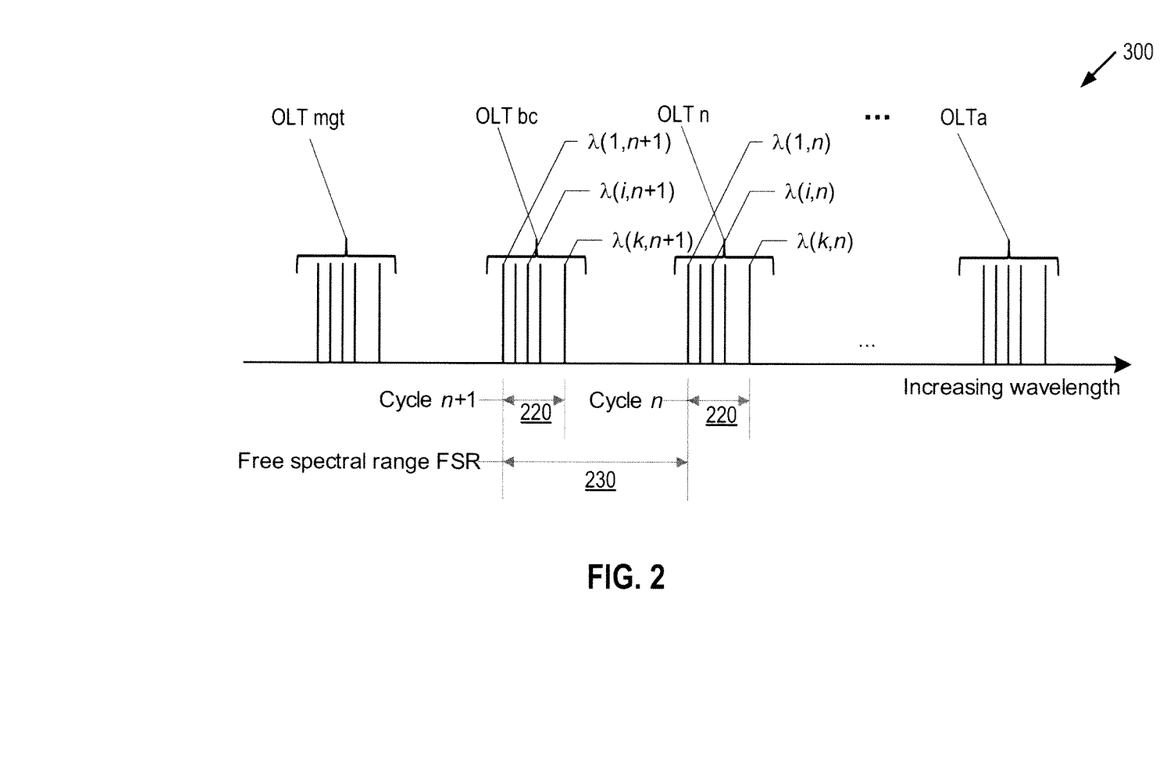
FIG. 2 is a diagram of an example illustrating a spectral distribution at an AWG.

FIG. 2 is a diagram illustrating an example of a spectral distribution at the common port of the AWG 160, assuming that the AWG 160 receives downstream signals from a set of OLTs (e.g., OLT mgt, OLT bc, OLT a, OLT b, ..., OLT n). Each OLT is assigned to transmit on a different group of wavelengths referred to as an AWG cycle 220. Each AWG cycle 220 includes the same group of wavelength members $(1, 2, \ldots, k)$. For example, wavelength member i (i.e., the i-th wavelength) appears in each of the cycles 220. All members of a cycle lie close together in wavelength space, and each consecutive cycle differs from the previous cycle by a wavelength known in the art as the free spectral range (FSR) 230. Generally, the FSR 230 is determined by the geometry of the AWG 160 device. The de-multiplexing end of the AWG 160 is a set of individual ports. Available at an individual port i $(i=1, 2, \ldots, k)$ is a collection of wavelength members i from each of the cycles 220. That is, through port i of the AWG 160, an ONU can access the i-th wavelength of all cycles.

Figure 3:
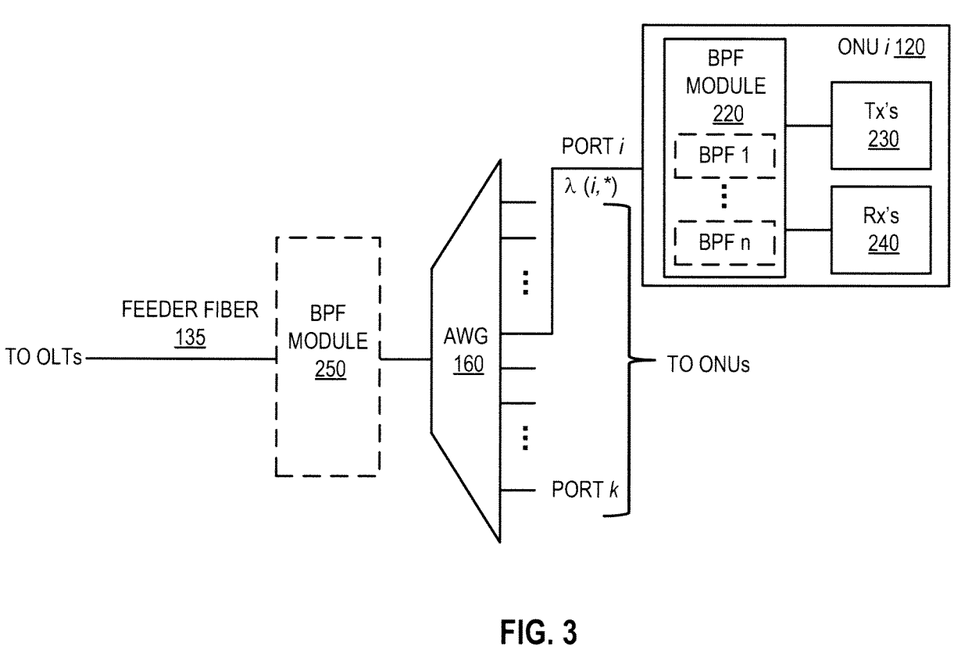
FIG. 3 is a diagram illustrating a portion of the PON of FIG. 1 according to one embodiment of the invention.

FIG. 3 is a diagram illustrating a portion of the PON 100 of FIG. 1 according to one embodiment of the invention. In one embodiment shown in FIG. 3, the feeder fiber 135 from the OLTs 110 is coupled to the AWG 160. In this embodiment, the AWG 160 has k individual ports, and each port i corresponds to a cyclically recurring wavelength i across all of the cycles. As shown in FIG. 2, each group of wavelengths includes k wavelengths that are clustered in a cycle 220, and each cycle is separated by the FSR 230 from its neighboring cycle. Thus, by coupling an ONU i (e.g., one of the ONUs 120 of FIG. 1) to port i of the AWG 160, ONU i can access all of the wavelengths i in the set $\lambda\{i, *\}$, where * indicates all of the cycles that are available at the common port of the AWG 160.

In FIG. 3, a bandpass filter (BPF) module 220 can be used by ONU i to select specific cycles for transmission and reception. In one embodiment, the BPF module 220 includes multiple BPFs, one or more of which may be coupled to transmitters 230 of ONU i and the others of which may be coupled to receivers 240 of ONU i. As used herein, the term BPF designates a filter that selects one cycle of the spectrum, while the term BPF module designates a multi-port assembly of BPFs, each port of which selects one cycle. The choice of cycle(s) may be fixed by the physical design of the BPF (module), or may be variable, e.g., under software control. Thus, ONU i can use a BPF module to select one or more particular SPs and/or services in either upstream or downstream direction.

In one embodiment, each of the transmitters 230 can be coupled to one BPF that is adapted to pass one cycle for upstream transmission. Similarly, each of the receivers 240 can be coupled to one BPF that is adapted to pass one cycle for downstream reception. That is, each BPF in the BPF module 220 is used to discriminate one cycle of the bandwidth for port i. The transmitters 230 and receivers 240 are adapted to the selected wavelengths for transmission and reception, respectively. The adaptation may be done through interactions with the associated BPFs or by other means.

With the use of the BPF module 220, it will be appreciated that:
- the ONU is independent of the specific port wavelength i, and is therefore amenable to high-volume undifferentiated mass production,
- an inexpensive fixed-purpose ONU can be created by designing all of the BPFs to single predetermined cycles,
- a flexible ONU can be created by designing one or more of the BPFs to be tunable, pluggable, or otherwise alterable,
- the design can be readily extended to a plurality of BPFs to allow for multiple independent transmitters or multiple independent receivers, or both.

The AWG 160 and the BPF module 220 enable an open access network architecture. Multiple BPFs within an ONU enable the simultaneous existence and use of multiple transmitters and/or receivers for different purposes. In this way, a single ONU may simultaneously subscribe over a single drop fiber to multiple speeds, modulation formats or service providers.

In alternative embodiments, a BPF module 250 can be located outside of ONU i. In an alternative network configuration, the BPF module 250 is placed at the OLT side of the AWG 160. The BPF module 250 may be used to allow access to only a limited subset of the possible cycles, while an individual AWG port selects one specific wavelength i from each of the limited subset of the possible cycles. This network configuration restricts the entire set of connected ONUs to a particular set of cycles. By placing the BPF module 250 external to the set of ONUs, network operators can limit the subscribers' access to bandwidth less than the full range of cycles (for example, a single transmit cycle and a single receive cycle). The BPF module 250 can select multiple contiguous or non-contiguous cycles. In this alternative network configuration, within ONU i there can be the BPF module 220 or a band splitter present to multiplex/de-multiplex transmitter and receiver wavelengths.

Figure 4A:
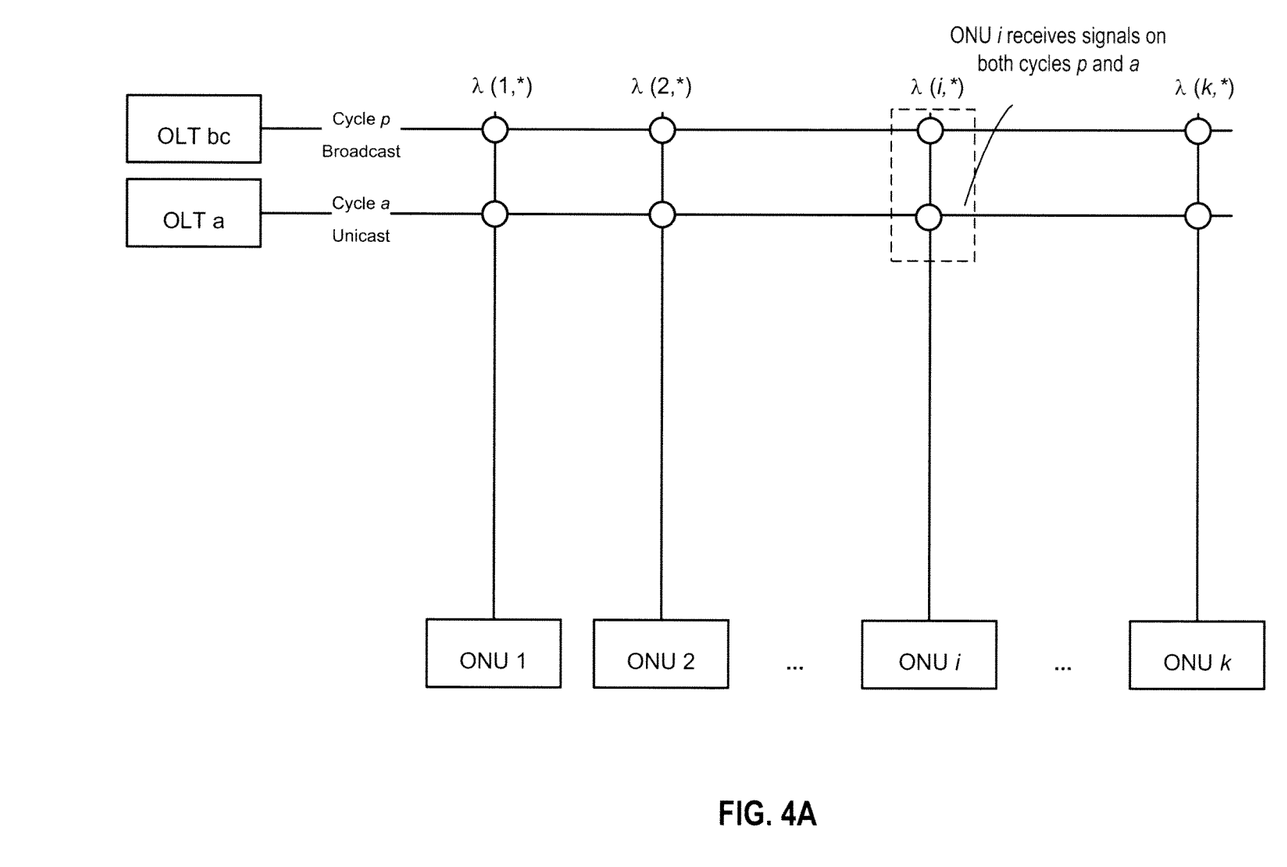
FIGS. 4A-4E are diagrams illustrating five embodiments of spectral allocation schemes for communication between OLTs and ONUs.

FIG. 4A is a diagram illustrating an example of a spectrum allocation scheme for downstream transmission from OLTs to ONUs (e.g., the OLTs 110 and the ONUs 120 of FIG. 1). In this example, a unicast OLT a and a broadcast OLT bc are assigned to transmit within their own unique cycles of the band plan (represented by the horizontal lines). For example, OLT a transmits on cycle a and OLT bc transmits on cycle p. In the field, a cyclic AWG (e.g., the AWG 160 of FIGS. 1 and 3) selects a set of wavelengths $\lambda\{i, *\}$ for each ONU i (vertical lines), where i indicates an individual AWG port i, and * indicates all of the cycles available at the common port of the AWG (including cycle p and cycle a). A circle at the intersection of a horizontal line (e.g., cycle p) and a vertical line (e.g., ONU i) indicates that ONU i is to receive signals on cycle p from the OLT (e.g., OLT bc) transmitting on that cycle.

In the embodiment of FIG. 4A, the cycle p may be reserved for the distribution of broadcast radio frequency signals to all of the ONUs in a PON. The light source at the broadcast OLT bc may be a broadband source that covers the entire spectral width of the specified cycle p, such that the source signal potentially need be modulated only once. This arrangement has the merit that electrical replication of multicast or broadcast signals is not required at the OLT bc, nor is a separate optical transmitter needed for broadcasting signals to each ONU.

With regard to the ONU receiver, two options are possible. First, if the broadcast channel uses a separate form of modulation at a low modulation index (for example, a low-frequency amplitude modulation of the signal might be invisible to the client traffic, but detectable as a separate channel for the purpose of conveying the broadcast signal), it may be possible that the ONU use a single photodetector and receiver for both broadcast and unicast wavelengths, with signal separation performed electrically in a pair of demodulators. This option may also be chosen if the broadcast signal p can be arranged to occupy an analog frequency spectrum well away from the spectrum of the unicast digital signal a. In such a case, it may be arranged for the BPF module 220 to de-multiplex more than one (e.g., two) cycles to the same ONU receiver. Second, it may be preferred to arrange the BPF module 220 to optically discriminate broadcast and unicast wavelength cycles and direct them into separate optical receivers and demodulators. The cost of a second receiver may be justified by the improved quality of the recovered analog signal. In such a second embodiment, two BPFs coupled to two ONU receivers can be used to pass cycles p and a for receiving the broadcast and unicast signals, respectively.

Although not shown in FIG. 4A, embodiments of the invention allow tunability at an ONU not only for signal reception but also for upstream transmission on specified spectral cycles. The selection of transmission cycles may occur through optical recognition (for example, by way of remote or self-seeding) of the single wavelength that is both accepted by an AWG and by a BPF. Cycle selection and fine tuning of transmit wavelength may also be done through electronic means, by the operation of message exchanges, and can be combined with local or remote electrical feedback information that is used to control tunable transmitters. The phrase "based on the downstream signal" is used herein to designate one or more of these options.

Figure 4B:
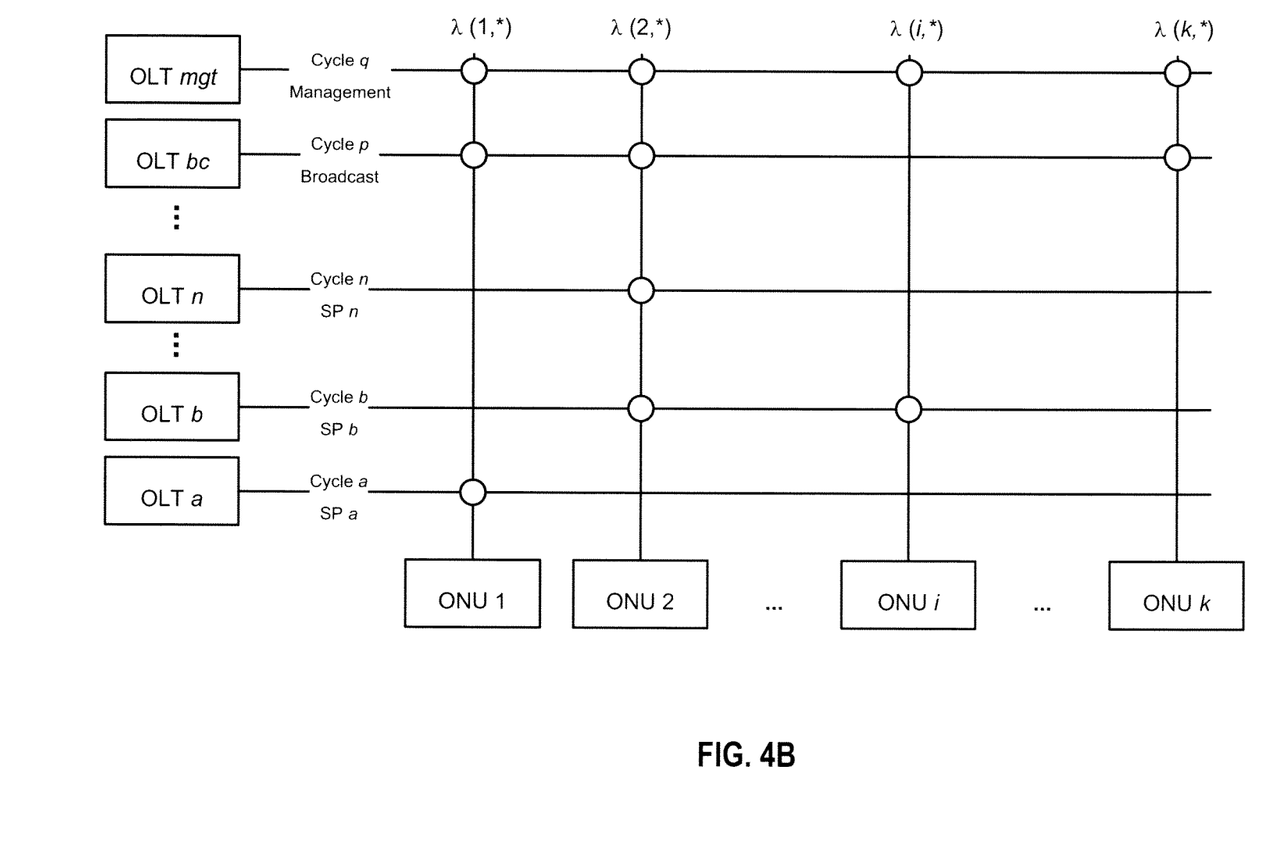

FIG. 4B is a diagram illustrating a second example of an open access spectrum allocation scheme that extends the embodiment of FIG. 4A. According to the embodiment of FIG. 4B, different service providers, shown in FIG. 4B as distinct OLTs, may be allocated separate spectral cycles within the same overall band plan. An AWG-connected ONU i can connect to any of the service providers by selecting the proper cycle(s), either through fixed or pluggable BPF module hardware or by means of a tunable BPF module.

In FIG. 4B, each of the OLTs that shares a feeder fiber is assigned to transmit within a unique cycle of the band plan (horizontal lines). In the field, a cyclic AWG (e.g., the AWG 160 of FIG. 3) selects a set of wavelengths $\lambda\{i, *\}$ for each ONU i (vertical lines), where indicates an individual AWG port i, and * indicates all of the cycles available at the common port of the AWG. The available cycles include cycle q for management information, cycle p for broadcast signals, and cycles a, b, ... n for unicast signals. Each ONU can simultaneously subscribe to multiple wavelengths across multiple cycles for both transmission and reception. It is not necessary that the cycles a, b, ... n, ... p and q be in any particular order, as long as they are mutually distinct. Similar to FIG. 4A, the embodiment of FIG. 4B allows tunability at an ONU not only for signal reception but also for transmission on specified spectral cycles. The embodiment of FIG. 4B shows that a particular ONU i can select signal reception and transmission cycles that are different from the cycles chosen by other ONUs. Additionally (not shown in FIG. 4B), it will be apparent that an ONU can select two different sets of cycles, one for reception and the other for transmission.

FIG. 4B illustrates the downstream cycles that are received by the ONUs. As illustrated in the horizontal lines of FIG. 4B, each OLT corresponds to a service provider (SP) or service that transmits on a different cycle. For example, OLT mgt provides management service and is assigned to cycle q, OLT be provides broadcast service and is assigned to cycle p, OLT a corresponds to SP a and is assigned to cycle a; OLT b corresponds to SP b and is assigned to cycle b; ..., and OLT n corresponds to SP n and is assigned to cycle n. Through configuration of its BPFs, each ONU may select service from one or more of these OLTs. For example, ONU 1 subscribes to management service, broadcast service and SP a, ONU 2 subscribes to management service, broadcast service, SP b and SP n, ONU i subscribes to management service and SP b, and ONU k subscribes only to management service and broadcast service.

Thus, the ONU coupled to an AWG-based ODN can simultaneously subscribe to a selected plurality of service providers, based on each service provider's AWG cycle and the BPF module configuration in the ONU. Each AWG cycle is dedicated to a particular service provider, modulation format, rate or other distinguishing characteristic.

Figure 4C:
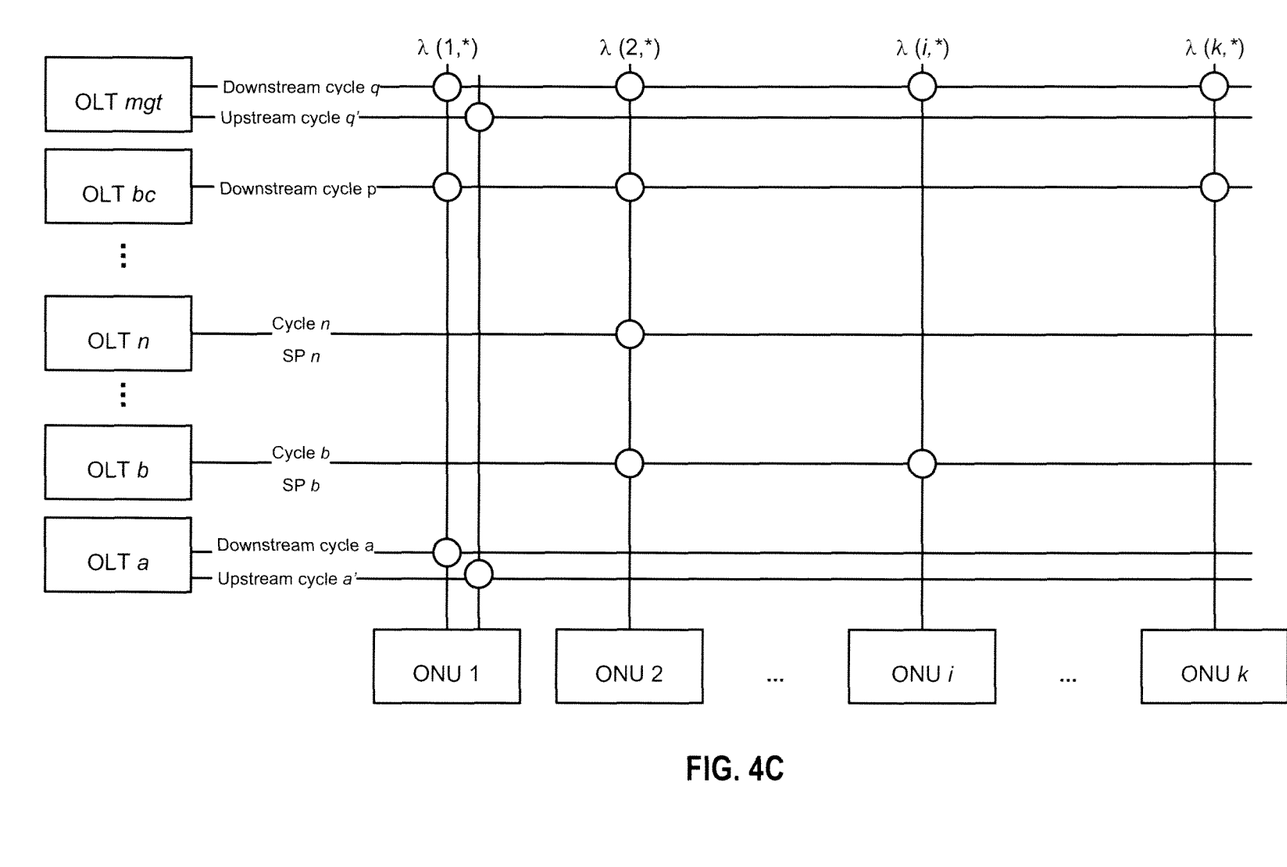

In some embodiments, the same wavelength, i.e., the same cycle, can be re-used for both transmission and reception. In some embodiments, the upstream cycles can be different from the downstream cycles. FIG. 4C illustrates an example in which an ONU (e.g., ONU 1) receives on one set of cycles and transmits on another set of cycles in connection with the same OLT. The same applies to any of the other ONUs. In the example of FIG. 4C, it is shown that ONU 1 receives on cycles p, q and a, and transmits on cycles q' and a'. In one embodiment, the OLT mgt sends management information downstream on cycle q. Using the upstream management cycle q', ONU 1 can request from OLT mgt a free channel on cycle a' for upstream transmission to SP a. The BPFs and transmitter of ONU 1 can then be tuned such that the ONU's transmitter can transmit upstream signals to SP a on cycle a'.

A distinct feature illustrated in both FIGS. 4B and 4C is common management access, whereby a source of common management communications serves all ONUs. It is beneficial if all ONUs on a WDM PON participate in a common negotiation and management domain. Thus, embodiments of the invention allow all ONUs to access management information on one or more common channels. Each ONU may include one or more designated management BPFs that are tuned to the management cycles (upstream and downstream). The other BPFs in the ONU can be designated as service-specific and can be adapted to receive and/or transmit according to the management information. The management cycle q may also be used for fine tuning control of some or all of the upstream transmit wavelengths.

Thus, embodiments of the invention provide a method of transmitting downstream management information from a single broadband transmitter on all wavelengths of a common AWG cycle, thereby potentially achieving the benefits of a single OLT transmitter in an AWG-based ODN, while avoiding the need to replicate management information at a number of OLT transmitters. The management OLT may also be known as a broker or a broker OLT, particularly if it conveys management and control information on behalf of a number of SPs. The common cycle is accepted by all of the ONUs. By using the common cycle (also referred to as a "common channel") for downstream management communications, all of the ONUs are permitted to receive information that is common and of interest to all of them. In particular, when an ONU initializes, it may need to discover attributes of the WDM PON system; for example, maximum allowable transmit power levels or the availability of a particular wavelength (as determined by its AWG port) within a particular spectral cycle. A common management channel facilitates such discovery, as well as supporting the downstream direction of a rendezvous (activation) protocol that may be required for an ONU to declare itself, to be identified and authenticated, or to negotiate the choice of a provider.

In the upstream direction, embodiments of the invention provide a method of time-division transmission of management information from the ONUs. The time slots allocated to the ONUs are authorized by OLT mgt prior to the ONUs' transmission of client data. Such upstream authorization may be as simple as for example a half-duplex request-response protocol, or as sophisticated as a full TDMA protocol, for example as described in ITU-T recommendation G.984.3. The single management channel receiver at OLT mgt has a spectral response that includes at least the entire upstream AWG cycle (e.g., cycle q' of FIG. 4C) used by the plurality of ONUs.

Downstream management communications may be achieved in two alternative ways as follows.

First, each individual OLT may send all downstream management traffic on all wavelengths under its ownership. This has disadvantages apparent in the overhead required at every OLT transmitter, and potentially in increased complexity of the circuitry; for example, to superimpose a low-level amplitude modulated signal onto the primary payload signal.

Second, OLT mgt may transmit some or all downstream management traffic on a single designated non-cyclical wavelength. This requires that ONUs either search for the designated wavelength or that the designated wavelength be known in advance; for example, through configuration or standardization. This technique is incompatible with fixed-wavelength ODNs; for example, those comprising AWGs, because an ONU may be physically precluded from tuning to the single management wavelength.

Figure 4D:
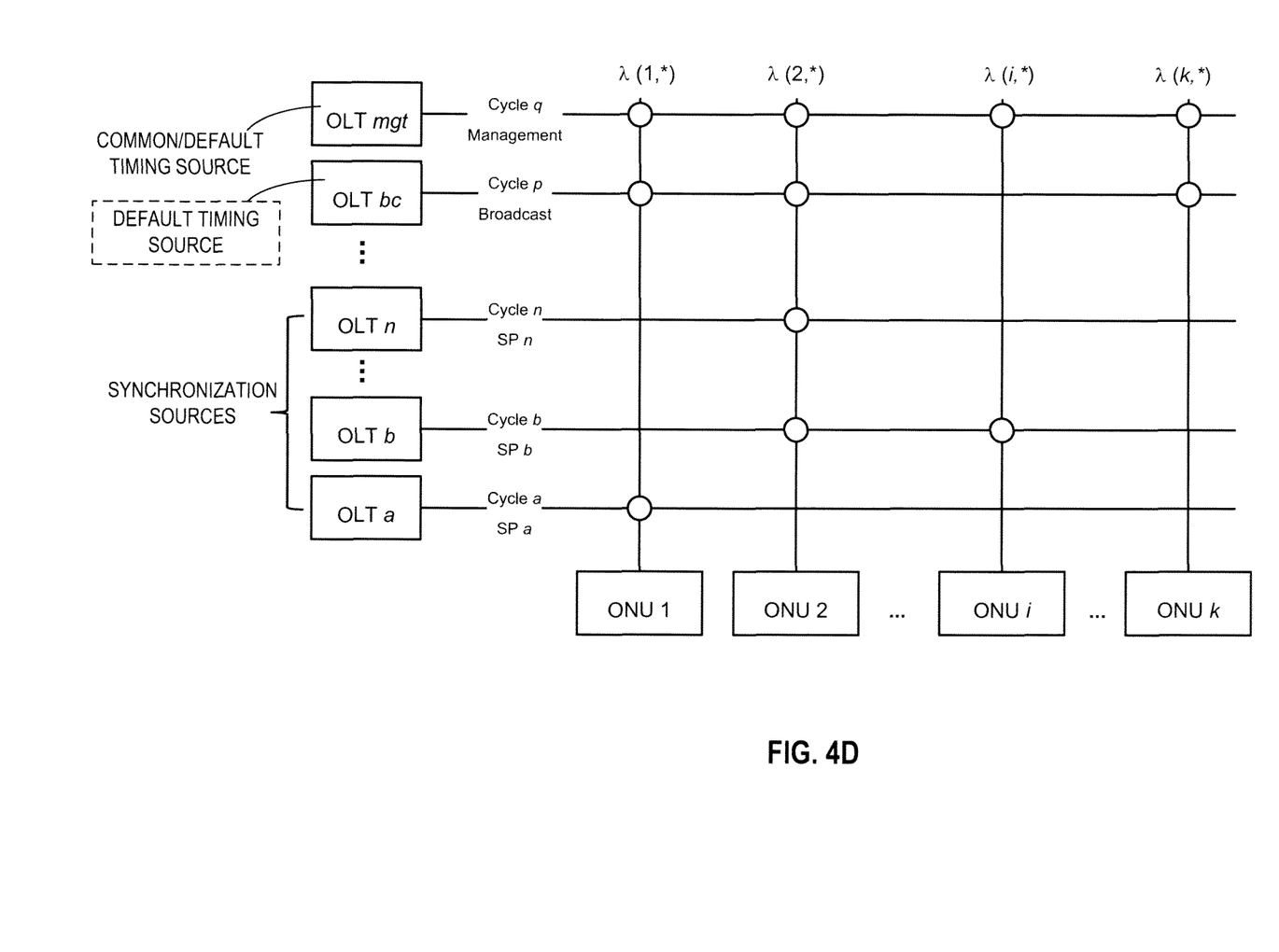

FIG. 4D is a diagram illustrating an example of using multiple AWG cycles for synchronization. Some operators or end customers require separate, or multiple, timing domains for different services. In one embodiment of the invention, one or more spectral cycles may be used to distribute timing information; for example, frequency and time of day information, either with or without additional payload, for example with Synchronous Ethernet or IEEE 1588 packets. This permits the subscribing ONUs to accept frequency and/or time of day references from multiple timing domains that may differ from the baseline timing domain used for payload transport in the dedicated per-ONU WDM PON. This timing information can be distributed to ONUs based on their subscription to such synchronization wavelengths. Thus, embodiments of the invention allow for clean and independent distribution of multiple timing domains over a PON.

In FIG. 4D, OLTs a, b, ... n can be synchronization sources from separate timing domains, instead of, or in addition to, payload transport nodes. The broadcast OLT be and/or the management OLT mgt can be used to distribute the network operator's common timing; for example, for synchronizing the operations of the ONUs, as well as for default timing in the case that an ONU need not subscribe to an alternate timing domain.

Figure 4E:
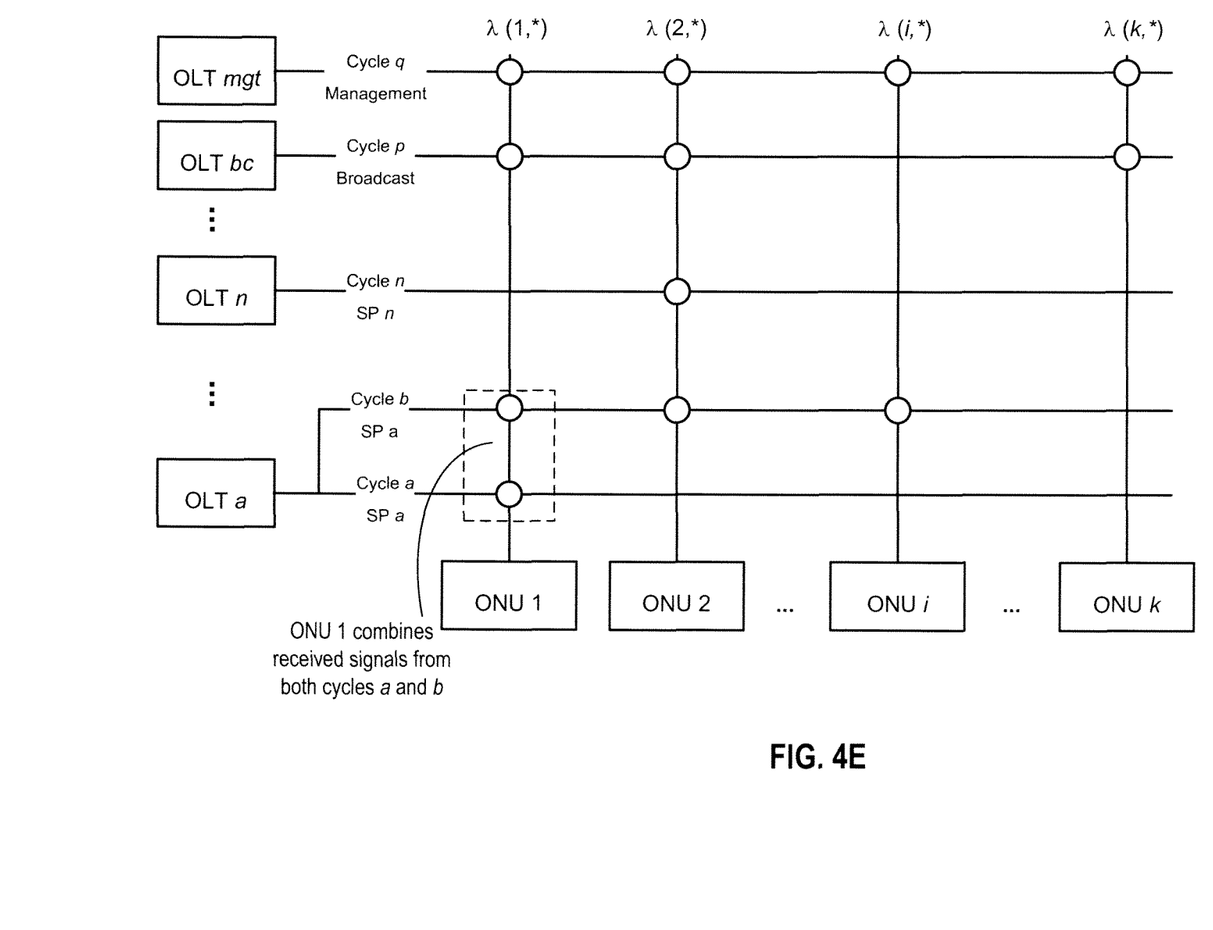

In some embodiments, the same wavelength member i may be used across multiple cycles to realize aggregate service beyond the capability of a single wavelength i in a single cycle a. The increased capacity may be achieved through bonding, link aggregation or other means. For example, two cycles of gigabit Ethernet (GbE) can be combined in a link aggregation group to provide an aggregate of two gigabits per second (Gb/s) Ethernet service. FIG. 4E illustrates an embodiment in which OLT a is assigned to both cycle a and cycle b. Each wavelength i in each cycle can carry one gigabit per second of Ethernet traffic. At the receiving end, ONU 1 (for example) can combine (i.e., bond or aggregate) the data on both cycles a and b to obtain twice the data rate as is available from only one cycle. In some embodiments, more than two cycles can be bonded together for a single OLT to deliver high speed service to ONUs. At the receiving end, ONU 1 (for example) can include a separate receiver (or transmitter) for each of the bonded cycles. The signals on the bonded cycles can be multiplexed (or de-multiplexed) to provide a composite service that exceeds the capacity of a single wavelength on a single cycle.

Figure 5:
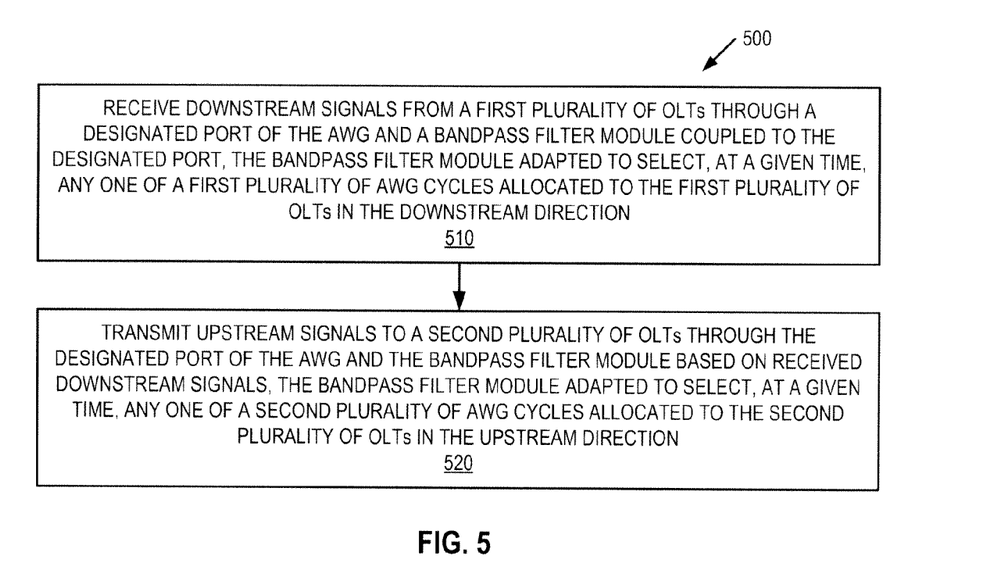
FIG. 5 is a flowchart of one embodiment of a method performed by an ONU for communicating with a selected subset of OLTs.

FIG. 5 is a flow diagram illustrating one embodiment of a method 500 performed by an ONU (e.g., the ONU 120 of FIGS. 1 and 3) coupled to an AWG-based ODN. The ONU receives downstream signals from multiple OLTs (i.e., a first plurality of OLTs) through a designated port of the AWG and through a BPF module coupled to the designated port (block 510). As shown in the FIG. 3, the BPF module may be within the ONU (e.g., the BPF module 220) or separate from the ONU (e.g., the BPF module 250). The downstream signals from a first plurality of OLTs to the ONU are transmitted on a first plurality of AWG cycles allocated to the first plurality of OLTs. For signal reception, the BPF module is adapted to select (pass) any one of the first plurality of AWG cycles at a given time, thereby enabling the ONU to receive services from any one of the first plurality of ONUs. Based on received downstream signals, the ONU transmits upstream signals to multiple OLTs (e.g., a second plurality of OLTs) through the designated port of the AWG and through the BPF module (block 520). In some embodiments, the second plurality of OLTs can be different from the first plurality of OLTs. The upstream signals from the ONU to the second plurality of OLTs are transmitted on a second plurality of AWG cycles allocated to the second plurality of OLTs. For signal transmission, the BPF module is adapted to select (pass) any one of the second plurality of AWG cycles at a given time. The ONU transmitter or transmitters are likewise adapted to transmit on the correct cycle as well as the correct member wavelength i. As described above, embodiments of the invention provide flexibility to an ONU to choose one service at any given time, and to change that one service at a later date if necessary. Embodiments of the invention also enable the ONU to simultaneously access multiple services or providers that share a wavelength-division PON, where the wavelength splitters are cyclic (e.g., the AWG 160 of FIGS. 1 and 3) and different services are transmitted on different cycles.

Figure 6:
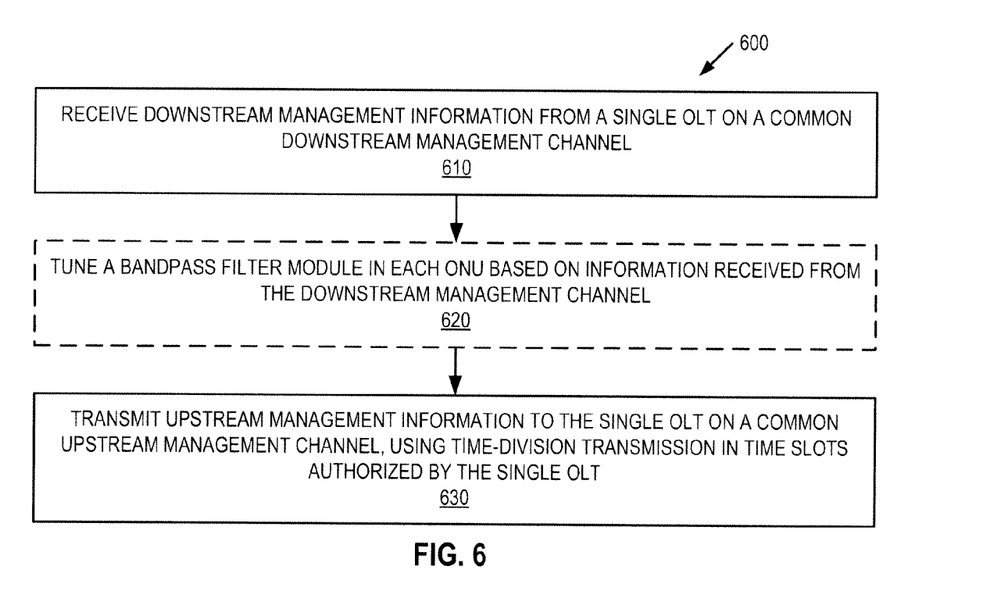
FIG. 6 is a flowchart of one embodiment of a method performed by ONUs to exchange management communications.

FIG. 6 is a flow diagram of one embodiment of a method 600 performed by ONUs (e.g., the ONUs 120 of FIGS. 1 and 3) coupled to an AWG-based ODN. The ONUs receive downstream management information from a single OLT on a common downstream management channel (block 610). In embodiments where the BPF module associated with each ONU is tunable in the field, the BPF module is tuned based on information received from the downstream management channel (block 620), as are the ONU's transmitter(s). The ONUs then transmit upstream management information to the single OLT on a common upstream management channel, using time-division transmission in time slots authorized by the single OLT (block 630). The downstream management channel and the upstream management channel form a bidirectional management channel that is provided for communication between the plurality of ONUs and the single OLT. Thus, management information can be efficiently distributed to all of the ONUs through a single broad-spectrum management transmitter and a single broad-spectrum management receiver.

The operations of the flow diagrams of FIGS. 5 and 6 have been described with reference to the exemplary embodiment of FIGS. 1 and 3. However, it should be understood that the operations of the flow diagrams of FIGS. 5 and 6 can be performed by embodiments of the invention other than those discussed with reference to FIGS. 1 and 3, and the embodiments discussed with reference to FIGS. 1 and 3 can perform operations different from those discussed with reference to the flow diagrams. While the flow diagrams of FIGS. 5 and 6 show a particular order of operations performed by certain embodiments of the invention, it should be understood that such order is exemplary (i.e., alternative embodiments may perform the operations in a different order, combine certain operations, overlap certain operations, etc.).

It is to be understood that the techniques shown in the figures can be implemented using code and data stored and executed on one or more electronic devices (e.g., an end station, a network element, etc.). Such electronic devices store and communicate (internally and/or with other electronic devices over a network) code and data using non-transitory machine-readable or computer-readable media, such as non-transitory machine-readable or computer-readable storage media (e.g., magnetic disks; optical disks; random access memory; read only memory; flash memory devices; and phase-change memory). In addition, such electronic devices typically include a set of one or more processors coupled to one or more other components, such as one or more storage devices, user input/output devices, and network connections. The coupling of the set of processors and other components is typically through one or more busses and bridges (also termed as bus controllers). The storage devices represent one or more non-transitory machine-readable or computer-readable storage media and non-transitory machine-readable or computer-readable communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software, that communicatively interconnects other equipment on the network (e.g., other network elements, end stations, etc.). Some network elements are "multiple services network elements" that provide support for multiple networking functions (e.g., routing, bridging, switching, layer 2 aggregation, session border control, multicasting, and/or subscriber management), and/or provide support for multiple application services (e.g., data, voice, and video).

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method for an optical network unit (ONU) to access services provided by a plurality of optical line terminals (OLTs) in a wavelength division multiplexing (WDM) passive optical network (PON), the OLTs being coupled to the ONU through an optical distribution network that includes an arrayed waveguide (AWG) having multiple ports that transmit multiple AWG cycles in both upstream and downstream directions, wherein each of the AWG cycles has a cyclically recurring wavelength pattern with an i-th wavelength in each of the AWG cycles being available at an i-th port of the AWG, the method comprising the steps of:

receiving downstream signals from a first plurality of OLTs at the same time through a designated one of the ports of the AWG and a bandpass filter module coupled to the designated port, the first plurality of OLTs being allocated with a first plurality of AWG cycles for downstream transmission, the bandpass filter module being adapted to select any one of the first plurality of AWG cycles at a given time; and     transmitting upstream signals to a second plurality of OLTs through the designated port of the AWG and the bandpass filter module based on received downstream signals, the second plurality of OLTs being allocated with a second plurality of AWG cycles for upstream reception, the bandpass filter module and a transmitter of the ONU being adapted to select any one of the second plurality of AWG cycles at a given time.

2. The method of claim 1, wherein the bandpass filter module is adapted to select multiple AWG cycles associated with the designated port of the AWG at a given time, in either or both upstream and downstream directions, thereby enabling the ONU to simultaneously subscribe to multiple services.

3. The method of claim 1, wherein a second bandpass filter module is coupled to a common port of the AWG and serves to limit access by the ONU to a limited subset of the AWG cycles in in either or both upstream and downstream directions.

4. The method of claim 1, wherein the AWG cycles are grouped into a plurality of groups, each group being dedicated to a service provider, a modulation format, a transmission rate, or another distinguishing feature of a communication service.

5. The method of claim 1, wherein one of the first plurality of AWG cycles is a downstream management channel that is common to a plurality of ONUs coupled to the AWG and one of the second plurality of AWG cycles is an upstream management channel that is common to the plurality of ONUs.

6. The method of claim 5, wherein the downstream management channel and the upstream management channel form a bidirectional management channel that is provided for communication between the plurality of ONUs and a single one of the OLTs, the method further comprising the steps of:

receiving downstream management information by the plurality of ONUs from the single OLT in the downstream management channel; and     transmitting upstream management information from the plurality of ONUs to the single OLT using time-division transmission in time slots authorized by the single OLT.

7. The method of claim 5, wherein the step of receiving further comprises:

tuning the bandpass filter module, an ONU transmitter, or a combination of both, by the ONU based on information received from the downstream management channel.

8. The method of claim 1, wherein the method further comprises the step of:

receiving synchronization information by the ONU from one or more of the AWG cycles to which the ONU subscribes, the synchronization information including information about frequency, time, or a combination of both.

9. The method of claim 1, wherein the method further comprises the step of:

receiving synchronization information by the ONU from two or more of the AWG cycles to which the ONU subscribes, each of the two or more AWG cycles associated with a different timing domain.

10. The method of claim 1, wherein the method further comprises the step of:

combining signals received by the ONU from two or more different ones of the AWG cycles to obtain an aggregated downstream service provided by one of the OLTs that is allocated to the two or more different AWG cycles.

11. The method of claim 10, wherein the method further comprises the step of:

transmitting signals from the ONU into two or more different ones of the AWG cycles to obtain an aggregated upstream service provided by one of the OLTs that is allocated to the two or more different AWG cycles.

12. A network element functioning as an optical network unit (ONU), which accesses services provided by a plurality of optical line terminals (OLTs) in a wavelength division multiplexing (WDM) passive optical network (PON), the OLTs being coupled to the ONU through an optical distribution network that includes an arrayed waveguide (AWG) having multiple ports that transmit multiple AWG cycles in both upstream and downstream directions, wherein each of the AWG cycles has a cyclically recurring wavelength pattern with an i-th wavelength in each of the AWG cycles being available at an i-th port of the AWG, the network element comprising:

a bandpass filter module coupled to a designated one of the ports of the AWG, wherein the bandpass filter module is adapted to select, at a given time, any one of a first plurality of AWG cycles allocated to a first plurality of OLTs for downstream reception by the ONU, and wherein the bandpass filter module is further adapted to select, at a given time, any one of a second plurality of AWG cycles allocated to a second plurality of OLTs for upstream reception by the OLTs;

one or more receivers coupled to the bandpass filter module adapted to receive the downstream signals from the first plurality of OLTs at the same time through the designated port of the AWG and the bandpass filter module; and     one or more transmitters coupled to the bandpass filter module adapted to transmit the upstream signals to the second plurality of OLTs through the designated port of the AWG and the bandpass filter module based on received downstream signals.

13. The network element of claim 12, wherein the one or more receivers include multiple receivers and the one or more transmitters include multiple transmitters, each of the receivers adapted to receive on one or more of the first plurality of AWG cycles from the first plurality of OLTs, and each of transmitters adapted to transmit on one of the second plurality of AWG cycles to the second plurality of OLTs.

14. The network element of claim 12, wherein the ONU has access to a limited subset of the AWG cycles in either or both upstream and downstream directions, and wherein the ONU's access is limited by a second bandpass filter module that is coupled to a common port of the AWG.

15. The network element of claim 12, wherein the AWG cycles are grouped into a plurality of groups, each group being dedicated to a service provider, a modulation format, a transmission rate, or another distinguishing feature of communication service.

16. The network element of claim 12, wherein the ONU is adapted to select one of the first plurality of AWG cycles as a downstream management channel that is common to a plurality of ONUs coupled to the AWG, and wherein the ONU is adapted to select one of the second plurality of AWG cycles as an upstream management channel that is common to the plurality of ONUs.

17. The network element of claim 16, wherein the downstream management channel is provided for communication between the plurality of ONUs and a single one of the OLTs, wherein one of the receivers of each of the plurality of ONUs is adapted to receive downstream management information from the single OLT in the downstream management channel, and one of the transmitters of each of the plurality of ONUs is adapted to transmit upstream management information to the single OLT using time-division transmission in time slots authorized by the single OLT in the upstream management channel.

18. The network element of claim 16, wherein the bandpass filter module, at least one of the transmitters of the ONU, or a combination of both, is tunable based on information received from the downstream management channel.

19. The network element of claim 12, wherein one or more of the receivers of the ONU is adapted to receive synchronization information from one or more of the AWG cycles to which the ONU subscribes, the synchronization information including information about frequency, time, or a combination of both.

20. The network element of claim 12, wherein two or more of the receivers of the ONU are adapted to receive synchronization information from two or more AWG cycles to which the ONU subscribes, each of the two or more AWG cycles associated with a different timing domain.

21. The network element of claim 12, wherein one or more of the receivers of the ONU are adapted to combine signals from two or more different ones of the AWG cycles to obtain an aggregated downstream service provided by one of the OLTs that is allocated with the two or more different AWG cycles.

22. The network element of claim 12, wherein one or more of the transmitters of the ONU are adapted to transmit signals on two or more different ones of the AWG cycles to obtain an aggregated upstream service provided by one of the OLTs that is allocated to the two or more different AWG cycles.

* * * * *